106-81

United States Patent Office 3,468,685
Patented Sept. 23, 1969

3,468,685
PREPLASTICIZED METHYLCELLULOSE FILM AND
PROCESS OF PREPARING SAID FILM
Albert B. Savage, Midland, and Julius C. Aldrich,
Mount Pleasant, Mich., assignors to Dow Chemical Company, Midland, Mich., a corporation of
Delaware
No Drawing. Filed Aug. 1, 1966, Ser. No. 569,055
Int. Cl. C08b 21/00, 27/34
U.S. Cl. 106—189                       7 Claims

ABSTRACT OF THE DISCLOSURE

Improved methylcellulose films are prepared by incorporating certain water and film compatible plasticizers into an aqueous alkaline solution containing an alkali-soluble methylcellulose with a degree of substitution of about 0.2 to 0.7 before neutralization and coagulation in an acid-salt bath.

---

The present invention relates to a process for preparing a methylcellulose film that has been preplasticized before coagulation. It also relates to an aqueous solution for preparing a preplasticized methylcellulose film, which solution contains an alkali-soluble methylcellulose, an alkali metal hydroxide to solubilize the methylcellulose, and an effective amount of a plasticizer.

It is known in the art to prepare methylcellulose films by coagulating an alkali-soluble methylcellulose with an inorganic acid-salt coagulation solution. Such a process is disclosed, for example, by Cox in U.S. Patent 2,545,070. The desirability of plasticizing cellulostic films to improve their flexibility has long been recognized in the art. Typically, this plasticizing is presently done by passing the coagulated cellulosic film through a bath of glycerol or other plasticizer. This method is disadvantageous because it is wasteful of the plasticizer and results in uneven plasticizing.

The advantages of adding plasticizer to the cellulosic solution before it is coagulated are obvious. This has hitherto not been possible because the coagulum produced from such a preplasticized cellulosic solution has been too weak to be practical for further processing.

It has now been discovered that certain alkali-soluble methylcelluloses form strong enough coagulant gels to allow addition of plasticizer to the solution of such alkali-soluble methylcelluloses before coagulation. The novel methylcellulose solutions of this invention, which are suitable for coagulation to make a methylcellulose film, consist essentially of an admixture of from about 4 to about 9 percent by weight, solution basis, of an alkali-soluble methylcellulose; a sufficient amount of an alkali metal hydroxide, such as sodium hydroxide, potassium hydroxide, or lithium hydroxide, to solubilize the alkali soluble methylcellulose; and from about 1 to about 30 weight percent, methylcellulose basis, of a plasticizer.

The plasticizer is preferably present in an amount of from about 5 to about 20 weight percent, methyl cellulose basis. Generally, from about 3 to about 9 weight percent, solution basis, of the alkali metal hydroxide is used to solubilize the methylcellulose.

The present invention requires the use of an alkali-soluble methylcellulose. These methylcellulose ethers are insoluble in water and organic solvents but soluble in an aqueous solution containing from about 3 to about 9 percent by weight, solution basis, of an alkali metal hydroxide, such as sodium or potassium hydroxide. They are lightly substituted ethers having a methoxyl content of from about 5 to about 13 weight percent, corresponding to a degree of substitution (D.S.) ranging from about 0.2 to about 0.7. Methylcellulose which is soluble in an aqueous solution containing 6 percent by weight sodium hydroxide and having a methoxyl content of from about 5 to about 7 weight percent (0.2 to 0.3 D.S.) is preferred. Operable alkali-soluble methylcellulose should have a viscosity in a 2 percent by weight solution in 6 percent by weight aqueous sodium hydroxide of from about 20 to about 400 cps. at 20° C.

Methylcelluloses of sufficient substitution to be soluble in less than about 3 percent by weight sodium hydroxide solution are too water sensitive. Those methyl celluloses that appear soluble only in greater than about 9 percent by weight aqueous sodium hydroxide solutions are not truly soluble, and their solutions are not filterable. Such solutions tend to clog the extrusion slot when it is attempted to prepare a film from them. Methylcellulose having a viscosity lower than the minimum specified gives weak coagulums, while methylcellulsoe having a viscosity greater than the maximum specified gives solutions that do not filter well and tend to clog the extrusion slot at concentration levels sufficient to produce films.

Particularly suitable alkali-soluble methyl-cellulose is that described by Maasberg in U.S. Patent 2,408,326, the disclosure of which is incorporated by reference herein. However, any alkali-soluble methylcellulose having the properties given above is operable.

In general, any water-miscible plasticizer conventionally employed for methylcellulose films is operable in the present invention. Suitable specific examples include poly(ethylene glycols) having molecular weights between about 500 and about 5,000, glycerol, hydroxylated aliphatic amides such as Nopco GS–15, a product of the Nopco Chemical Company, Newark, N.J., sodium silicate, sorbitol, propylene glycol, and the like.

The preferred plasticizers for the practice of this invention are the poly(ethylene glycols) having molecular weights between about 500 and about 5,000. These give high yield points, high tensile strengths, and satisfactory elongation properties in the finished film. Lower poly (ethylene glycols) tend to to cause excessive fluidity of the methyl cellulose solution. Glycerol tends to cause softening in the finished film, but it is advantageously used in combination with the poly(ethylene glycols). The plasticizers may be used either singly or in combination.

The method used to prepare the aqueous solution of alkali metal hydroxide and alkali-soluble methylcellulose is not critical. Alkali-soluble methylcellulose prepared according to U.S. Patent 2,408,326 may be dissolved in the alkali metal hydroxide solution by simple mixing at temperatures between 15 and 20° C. Such solutions may be diluted from their initial concentrations by the addition of water without precipitating the methylcellulose. Preferably, the methylcellulose is dissolved in the alkali metal hydroxide solution before the plasticizer is added. The plasticizer may be mixed into the alkali soluble methylcellulose solution either before or after filtration to remove insolubles. The solutions are desirably cooled, e.g., to between about 8° to 10° C. to facilitate faster filtering. They may be filtered at room temperature, however.

Methylcellulose films are prepared from the solutions of this invention according to conventional procedures known in the art. For example, the methyl cellulose solution may be extruded into a coagulating bath containing an aqueous inorganic acid-salt solution, thereby forming a self-supporting film. Alternatively, the solution may be extruded or passed onto a suitable surface, such as a continuous belt, and conveyed into the bath. The coagulant solution is preferably dilute sulfuric acid saturated with sodium sulfate. Alternatively, a coagulant bath of phosphoric acid and sodium phosphate or of hydrochloric acid and sodium chloride may be employed. The methylcellulose solution is preferably extruded through a die having a slit of proper dimensions to obtain a finished film of about 1 to about 8 mils thickness and of the desired width. As the caustic in the extruded methylcellulose solution is neutralized by the acid in the coagulating bath, the salt causes immediate coagulation and gelation of the water-insoluble methylcellulose, thereby forming a self-supporting film which can be drawn from the bath, water washed, dried and stored for later use.

The inorganic acid-salt bath used to treat the extruded film serves not only to convert the alkali-soluble methylcellulose into a water-insoluble form but also dehydrates and "salts out" the methylcellulose film. Since sulfates are particularly effective in "salting out" the methylcellulose film, the sulfuric acid-sodium sulfate bath is preferred. However, baths containing phosphoric or hydrochloric acid and the corresponding salts can also be used. For rapid neutralization with the preferred sulfuric acid bath, the concentration of sulfuric acid should be at least about 8 weight percent and preferably from about 10 to about 30 weight percent. The sodium sulfate content should be at least 15 weight percent and preferably near the saturation level. By addition of make-up sulfuric acid and water and removal of spent coagulation solution, the concentration of acid and salt can be maintained within desired limits for continuous operation. Bath temperatures of from about 15 to 45° C. can be employed. Since rapid coagulation is enhanced by heat, a temperature between about 30 and 45° C. is often advantageous. Higher temperatures tend to degrade the film.

To achieve essentially complete neutralization and coagulation of a methylcellulose film up to about 10 mils thickness, a contact time in the sulfuric acid-sodium sulfate bath of from about 10 to about 60 seconds at about 30° to about 40° C. is usually adequate. The methylcellulose film is then taken from the coagulation bath and washed with water to remove the excess acid and the soluble salts. The water wash can be accomplished by using a water bath, water sprays, or other means, but preferably with water preheated to between about 40° and about 95° C., since hot water is more effective in removing the salts and strengthening the coagulated methylcellulose film.

Following the water wash, the methylcellulose film can be further treated as desired prior to final drying. For example, brief contact with a dilute sodium bicarbonate solution can be used to insure complete neutralization of any residual inorganic acid. A film weakened by prolonged soaking in water can be strengthened by return to the acid-salt bath.

The methylcellulose film is dried at from about 20 to about 120° C., advantageously through contact with a heated metal roll having a surface temperature of from about 100 to about 120° C. To minimize darkening of the film, temperatures higher than about 120° C. should be avoided.

In this process, a methylcellulose film having a dry thickness of about at least about 1 mil has adequate strength even in the coagulation bath; it is self-supporting under normal operating conditions. However, for high speed operations, use of a continuous belt or similar means to support the film may be advantageous.

The dried methylcellulose film is flexible and self-supporting over a wide range of temperature and relative humidity. Typically, it contains by analysis less than about 0.5 percent inorganic acid calculated as sulfuric acid and less than about 0.1 weight percent inorganic sulfate. It is readily wound into coils which may be stored under ambient conditions. Storage at relative humidities between about 20 and about 80 percent is advantageous for optimum quality.

The methylcellulose film thus produced is a strong, uniformly plasticized film which is insoluble in and resistant to water, clear, transparent, strong, and flexible. It may be substituted for cellophane in packaging.

The following specific examples are representative embodiments and preferred modes contemplated by the inventors for the practice of the invention claimed. The scope of the invention is limited only by the claims appended hereto.

EXAMPLE 1

A quantity of 100 g. of methylcellulose having 6.1 weight percent methoxyl groups (D.S. 0.29) and having a 2 weight percent solution viscosity in 6 percent by weight sodium hydroxide at 20° C. of 36 cps. is dissolved in a solution of 86 g. of sodium hydroxide in 1,220 g. of water, by mixing with a twisted wire agitator at room temperature. When solution is complete, 7.5 g. of poly(ethylene glycol) having a molecular weight of 4,000 and 7.5 g. of poly(ethylene glycol) having a molecular weight of 200 is mixed in. The solution is cooled to between 8° and 10° C. and filtered through a 150 mesh nickel screen in a pipe filter, using 20 p.s.i.g. air pressure. The viscosity of the filtered solution is 5,140 cps. at 20° C.

The methylcellulose solution is extruded through a die consisting of a 21 inch length of nickel pipe having 1⅞ inch I.D. and having a 3¼" x 14 mils horizontal slot in the housing at the lower end. Six p.s.i.g. air pressure is applied, and the solution is extruded into an acid-salt bath, which contains 11.4 percent by weight sulfuric acid and 22.4 percent by weight sodium sulfate. After extrusion is completed the bath contains 10.7 weight percent sulfuric acid and 23.5 weight percent sodium sulfate.

The resulting coagulum is drawn away at 30 feet per minute by rubber take-away rolls; it is found to contain 11 percent by weight solids. The coagulum is rinsed with a 7 percent by weight sodium bicarbonate solution, washed with hot water at 60° C., and wound up on a revolving drum. Strips of coagulum from the winding drum are dried on an electrically heated stainless steel drum for 40 seconds at 150° C. The finished films are flexible and strong, even at low relative humidity.

EXAMPLE 2

A series of films is prepared according to the procedure in Example 1 with different plasticizers. The resulting films have thicknesses between 0.0004 and 0.0008 inch. The yield points and strength of the films are measured at 68° F. and 50 percent relative humidity with a standard Instron test machine. The results obtained are summarized in the following table.

| Film | Plasticizer | Wt. percent plasticizer | Yield point, p.s.i. | Tensile strength, p.s.i. | Elongation, percent |
|---|---|---|---|---|---|
| 1 | Poly(ethylene glycol), molecular weight 600. | 10 | 10,700 | 11,000 | 8 |
| 2 | do | 10 | 6,000 | 11,000 | 5 |
| 3 | do | 15 | 8,600 | 12,000 | 7 |
| 4 | Poly(ethylene glycol), molecular weight 1,000. | 20 | 9,700 | 14,000 | 11 |
| 5 | Poly(ethylene glycol), molecular weight 600. | 10 | 9,200 | 12,700 | 6 |
| 6 | Poly(ethylene glycol), molecular weight 1,000. Glycerol | 5 10 | 3,800 | 12,000 | 7 |
| 7 | Poly(ethylene glycol), molecular weight 1,000. Glycerol | 15 10 | 8,800 | 13,000 | 9 |
| 8 | Poly(ethylene glycol), molecular weight 1,450. | 15 | 8,500 | 14,000 | 11 |
| 9 | Poly(ethylene glycol), molecular weight 1,000. | 15 | 8,400 | 14,600 | 9 |
| 10 | Poly(ethylene glycol), molecular weight 4,000. | 15 | 9,700 | 14,500 | 15 |
| 11 | Propylene glycol | 15 | 5,100 | 5,600 | 1 |
| 12 | Nopco GS-15 [1] | 15 | 8,000 | 10,000 | 5 |
| 13 | Propylene glycol | 10 | 6,300 | 6,500 | 2 |
| 14 | Glycerol | 10 | 5,700 | 6,200 | 2 |
| 15 | Tetra(ethylene glycol) | 15 | Solution too fluid to extrude | | |

[1] Obtained from Nopco Chemical Company, Newark, N.J., and identified as a liquid hydroxylated aliphatic amide, intermediate between glycerol and sorbitol in water take-up.

The above table shows that the most useful plasticizers are poly(ethylene glycols) having molecular weights between about 500 and about 5,000. Substitution of sodium silicate or aqueous sorbitol in equivalent amounts for the plasticizers used above gives similar advantageous results.

Substitution in the above examples of other alkali-soluble methylcelluloses having the properties given previously for the methylcellulose used in the above examples gives similar films. Additionally, the methylcellulose solution may be neutralized and coagulated with dilute phosphoric acid saturated with sodium phosphate or with dilute hydrochloric acid saturated with sodium chloride.

What is claimed is:

1. In the process of preparing a film from an alkali-soluble methylcellulose with a degree of substitution of about 0.2 to about 0.7 by neutralizing and coagulating a solution of the methylcellulose in a 3–9 weight percent solution of an alkali metal hydroxide with an inorganic acid-salt bath, the improvement which comprises: adding to the methylcellulose solution as a plasticizer from about 1 to 30 weight percent based on methylcellulose of at least one of a poly(ethylene glycol) having a molecular weight between about 500 and about 5000, a hydroxylated aliphatic amide, propylene glycol, sodium silicate, or sorbitol, and thereafter neutralizing and coagulating said methylcellulose solution with the inorganic acid-salt solution.

2. The solution of claim 1 wherein the alkali metal hydroxide is sodium hydroxide.

3. The process of claim 1 wherein the plasticizer is used in an amount of from about 5 to about 20 weight percent, methylcellulose basis.

4. The process of claim 1 wherein the plasticizer is a poly(ethylene glycol) having a molecular weight between about 500 and about 5,000.

5. The process of claim 1 wherein the plasticizer is a poly(ethylene glycol) having a molecular weight between about 500 and about 5,000 and is used in an amount of from about 5 to about 20 weight percent, methylcellulose basis.

6. A methylcellulose film prepared by the process of claim 5.

7. A methylcellulose film prepared by the process of claim 1.

References Cited

UNITED STATES PATENTS

| 2,350,161 | 5/1944 | Gloor | 106—81 |
| 1,722,927 | 7/1929 | Lilienfeld | 106—197 |
| 2,231,927 | 2/1941 | Lilienfeld | 106—197 |
| 2,447,756 | 8/1948 | Lilienfeld | 106—197 |

ALLAN LIEBERMAN, Primary Examiner

U.S. Cl. X.R.

106—81, 186